(12) United States Patent
Zuniga et al.

(10) Patent No.: US 9,880,784 B2
(45) Date of Patent: Jan. 30, 2018

(54) DATA ROUTING AND BUFFERING IN A PROCESSING SYSTEM

(71) Applicant: KnuEdge Incorporated, San Diego, CA (US)

(72) Inventors: Ramon Zuniga, San Diego, CA (US); Douglas A. Palmer, San Diego, CA (US)

(73) Assignee: KnuEdge Incorporated, San Diego, CA (US)

( * ) Notice: Subject to any disclaimer, the term of this patent is extended or adjusted under 35 U.S.C. 154(b) by 0 days.

(21) Appl. No.: 15/017,426

(22) Filed: Feb. 5, 2016

(65) Prior Publication Data

US 2017/0228194 A1    Aug. 10, 2017

(51) Int. Cl.
*G06F 3/06* (2006.01)

(52) U.S. Cl.
CPC ............ *G06F 3/0656* (2013.01); *G06F 3/061* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 5,884,040 A * | 3/1999 | Chung | ................ | H04L 49/9089 370/401 |
| 6,032,190 A * | 2/2000 | Bremer | ................... | H04L 49/25 370/389 |
| 6,157,951 A * | 12/2000 | Vasa | .................... | H04L 49/9073 709/223 |
| 6,252,879 B1 * | 6/2001 | Zhang | ................. | H04L 12/4625 370/401 |
| 6,256,313 B1 * | 7/2001 | Chung | ................ | H04L 49/9089 370/392 |
| 6,301,256 B1 * | 10/2001 | Vasa | ..................... | H04L 12/462 370/401 |
| 6,308,218 B1 * | 10/2001 | Vasa | ..................... | H04L 12/462 709/238 |
| 6,442,168 B1 * | 8/2002 | Vasa | ....................... | H04L 12/42 370/401 |
| 6,535,942 B1 * | 3/2003 | Karlsson | ................. | G06F 13/24 370/310 |
| 6,987,961 B1 * | 1/2006 | Pothana | ................ | G06F 15/167 455/412.1 |
| 7,889,734 B1 * | 2/2011 | Hendel | .................... | H04L 12/56 370/392 |
| 2002/0091826 A1 * | 7/2002 | Comeau | .................. | G06F 9/546 709/226 |
| 2004/0039941 A1 * | 2/2004 | Schmidt | .................. | H04L 45/60 726/12 |

(Continued)

*Primary Examiner* — Kevin Verbrugge
(74) *Attorney, Agent, or Firm* — Fish & Richardson P.C.

(57) ABSTRACT

In a computing system where an incoming packet can be written directly into one or more local registers of a processing unit, a packet interface routes packets arriving at a computing system to the local registers of the processing unit or to a memory shared by multiple processing units. The shared memory includes a portion configured as a first-in, first-out (FIFO) buffer for storing packets arriving for the processing unit when its local registers are full. The stored packets are then delivered to the processing unit's one or more registers when the registers become available.

14 Claims, 2 Drawing Sheets

(56) References Cited

U.S. PATENT DOCUMENTS

| | | | |
|---|---|---|---|
| 2004/0102951 A1* | 5/2004 | Agarwala | G06F 11/3656 703/23 |
| 2004/0103397 A1* | 5/2004 | Agarwala | G06F 11/3632 717/128 |
| 2004/0103400 A1* | 5/2004 | Johnsen | G06F 11/3652 717/128 |
| 2004/0153808 A1* | 8/2004 | Agarwala | G06F 11/3656 714/36 |
| 2006/0047754 A1* | 3/2006 | Wenkata Subramanian | G06Q 10/107 709/206 |

* cited by examiner

DATA ROUTING AND BUFFERING IN A PROCESSING SYSTEM

BACKGROUND

This disclosure relates to data routing and buffering in a computing system.

One widely used method for communication of data to a processing unit in a conventional processing system is for data to be written to a location in a shared general-purpose memory and for the processing unit read that data from that memory.

SUMMARY

In a processing system where communication of data is performed using packets, an incoming packet may be placed directly into a processing unit's local registers if those registers are empty. The processing unit's local registers hold the packet while the packet's data is being processed by the processing unit. While the processing unit is processing data stored in its local registers, additional packets received for the processing unit are stored in a shared memory until the processing unit has completed processing of the data stored in its local registers. After the processing unit has completed processing of the data stored in its local registers, packets stored in the shared memory are transferred in accordance with a first-in, first-out (FIFO) technique to the processing unit's local registers for processing by the processing unit. After all packets stored in the shared memory have been transferred to the processing unit's local memory and the processing unit has completed processing all the data from those packets, an incoming packet may be placed directly in the processing unit's local registers for processing by the processing unit.

Placing an incoming packet directly into a processing unit's local registers may provide an event-driven, synchronized way for processing units to receive one packet at a time, directly into its local registers. Buffering additional incoming packets in a shared memory while a packet is being processed by the processing unit may mitigate routing congestion to the processing unit. For example, in compute-bound applications which make heavy use of the processing unit's local registers, the packet routing network may become congested because packets destined for the processing unit are arriving faster than the processing unit can consume the data. Using the shared memory to buffer incoming packets may be effective in reducing or eliminating congestion.

In various implementations, the subject matter described here can be implemented as a system or device composed of hardware circuitry, or one or more processing units executing software instructions, or a combination thereof.

In an implementation, a system includes a first processing unit having a processor core configured to process data packets and at least one register configured to store a data packet to be processed by the processor core; a memory device accessible to a plurality of processing units including the first processing unit, the memory device having a portion configured to store data packets to be processed by the processor core of the first processing unit; and circuitry configured to perform operations including the following: receive a data packet to be processed by the processor core, determine whether the at least one register of the first processing unit contains valid data, and determine whether the memory device portion contains valid data. In response to determining that the at least one register does not contain valid data and that the memory device portion does not contain valid data, the received data packet is caused to be stored in the at least one register. In response to determining that the at least one register does not contain valid data and that the memory device portion contains valid data, at least one of (i) the received data packet is caused to be stored in the memory device portion, or (ii) a data packet previously stored in the memory device portion is caused to be transferred to the at least one register. In response to determining that the at least one register contains valid data, the received data packet is caused to be stored in the memory device portion.

The memory device portion may be configured as a first-in, first-out (FIFO) buffer. A starting memory location and a size of the memory device portion may be programmable. The memory device may have a plurality of portions including the memory device portion, each of the plurality of portions associated with a corresponding processing unit of the plurality of processing units, and each of the plurality of portions being configured to store data packets to be processed by a processor core of the associated processing unit.

The circuitry configured to determine whether the at least one register contains valid data may include circuitry configured to check a valid flag corresponding to the at least one register. In that case, the circuitry may be configured to perform operations further including setting the valid flag corresponding to the at least one register when causing a received data packet to be stored in the at least one register, and clearing the valid flag corresponding to the at least one register after all data stored in the at least one register has been processed by the processor core.

The circuitry configured to determine whether the memory device portion contains valid data may include circuitry configured to check a valid flag corresponding to the memory device portion. In that case, the circuitry may be configured to perform operations further including setting the valid flag corresponding to the memory device portion when causing a received data packet to be stored in the memory device portion, and clearing the valid flag corresponding to the memory device portion when all data packets previously stored in the memory device portion have been transferred to the at least one register.

In general, the circuitry configured to perform operations may be configured at least in part through software.

In another implementation, a method includes receiving a data packet to be processed by a processor core of a first processing unit, the processor core configured to process data packets stored by at least one register of the first processing unit; determining whether the at least one register of the first processing unit contains valid data; determining whether a memory device portion, accessible by a plurality of processing units including the first processing unit, contains valid data; in response to determining that the at least one register of the first processing unit does not contain valid data and that the memory device portion does not contain valid data, causing the received data packet to be stored in the at least one register; in response to determining that the at least one register does not contain valid data and that the memory device portion contains valid data, causing at least one of (i) the received data packet to be stored in the memory device portion, or (ii) a data packet previously stored in the memory device portion to be transferred to the at least one register; and in response to determining that the at least one register contains valid data, causing the received data packet to be stored in the memory device portion.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
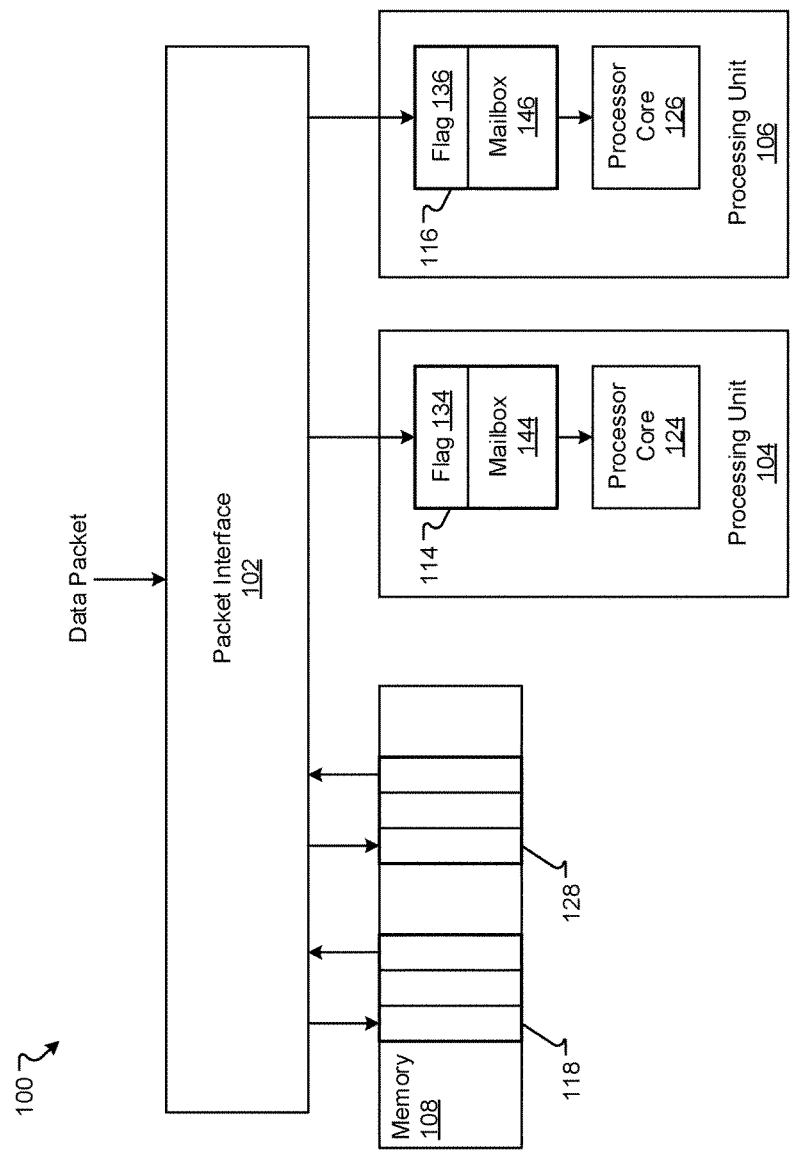
FIG. 1 is a block diagram showing an example of a computing system for routing packets.

FIG. 1 is a block diagram showing an example of a computing system 100 that implements data routing and buffering. The computing system 100 may be part of a network-on-a-chip as described in U.S. application Ser. No. 14/608,489 titled "Uniform System Wide Addressing for a Computing System," filed on Jan. 29, 2015, the entire contents of which are hereby incorporated by reference. Connections between the components of the computing system 100 include examples of packet data flow within the computing system 100, but are not intended to be limiting in any way.

The computing system 100 includes a packet interface 102, processing units 104 and 106, and a shared memory 108. The processing unit 104 includes local registers 114 and a processor core 124. Similarly, the processing unit 106 includes local registers 116 and a processor core 126. The processing units 104 and 106 share the memory 108. The memory 108 may include one or more memory devices, such as one or more dynamic random access memory (DRAM) devices.

Although two processing units 104 and 106 are shown in FIG. 1, the computing system 100 may be a processing cluster composed of any number of processing units (e.g., eight processing units) that share the memory 108. For a network-on-a-chip, there may be four superclusters, with each supercluster including eight processing clusters, and each processing cluster including eight processing units connected together on chip via a switched or routed fabric similar to what is typically seen in a computer network. Communication between components of the network-on-a-chip may be performed using packets, with each packet interface of each processing cluster being connected to one or more bus networks, where each bus network includes at least one data line. Each packet may include a target address (i.e., the address of the recipient) and a data payload.

The local registers 114 of the processing unit 104 includes a block of operand registers that serves as a "mailbox" 144 for the processor core 124 and a mailbox event flag 134. The mailbox 144 provides an event-driven, synchronized way for the processing unit 104 to receive one packet at a time directly into its local registers 114. The mailbox 144 provides a write-only, inbound packet interface for the processor core 124. The mailbox 144 holds one packet at a time. The mailbox event flag 134 is set when a packet's data is written to the mailbox 144. The mailbox event flag 134 is cleared by the processor core 124 when the processor core 124 is done processing data stored in the mailbox 144. Valid data is present in the mailbox 144 only when the mailbox event flag 134 is set, otherwise the data in the mailbox 144 is considered to be no longer valid. Packet writes to the mailbox 144 may be allowed only if the mailbox event flag 134 is cleared, which indicates that the mailbox 144 is empty (or, equivalently, not containing valid data). Data flows into the mailbox 144 from the packet interface 102 and is subsequently used by the processor core 124.

Processing unit 106 has analogous components and operates in an analogous manner as processing unit 104. That is, the local registers 116 of the processing unit 106 includes a block of operand registers that serves as a mailbox 146 for the processor core 126 and a mailbox event flag 136. The mailbox 146 provides an event-driven, synchronized way for the processing unit 106 to receive one packet at a time directly into its local registers 114. The mailbox 146 provides a write-only, inbound packet interface for the processor core 126. The mailbox 146 holds one packet at a time. The mailbox event flag 136 is set when data is written to the mailbox 146. The mailbox event flag 136 is cleared by the processor core 126 when the processor core 126 is done processing data stored in the mailbox 146. Valid data is present in the mailbox 146 only when the mailbox event flag 136 is set. Packet writes to the mailbox 146 may be allowed only if the mailbox event flag 136 is cleared, which indicates that the mailbox 146 is empty (or, equivalently, not containing valid data). Data flows into the mailbox 146 from the packet interface 102 and is subsequently used by the processor core 126. Additional details regarding a processing unit's "mailbox" functionality are described in U.S. application Ser. No. 14/921,377 titled "Register Communication in a Network-on-a-chip Architecture" filed Oct. 23, 2015, the entire contents of which are hereby incorporated by reference.

Before any packets start arriving at a processing unit, the processing unit's mailbox is empty and the mailbox event flag is low (cleared or de-asserted). When a packet arrives at the packet interface 102 targeted at the processing unit, the packet interface 102 writes the packet's data payload into the mailbox and sets the mailbox event flag. If the processing unit was sleeping while waiting for a packet to arrive, the processing unit will be awakened by the setting of the mailbox event flag. The processor core of the processing unit will read and use the data held in the mailbox. After the processor core is done processing the data, the processor core clears the mailbox event flag. When the mailbox event flag is cleared, the packet interface 102 will be able to write the next incoming packet targeting the processing unit directly into the mailbox.

When a mailbox of a processing unit is full, the processing unit cannot accept additional packets arriving at the processing unit. Typically, backpressure would be applied, and the incoming packets may back up at a router interconnect. This means that, in compute-bound applications, which make heavy use of processing units' mailboxes, the packet routing network may become congested because the packets destined for the processing units are arriving faster than the processing units can consume the data. Packets for processing units may be coming into a processing cluster from other processing clusters, other superclusters, or from other chips. The first packets for the processing units are written directly into the mailboxes. If the processing units are slower in processing the packets than the arrival rate, the packets may back up at progressively higher levels of the router interconnect and may block some or all packet traffic at each level.

The shared memory 108 may be used to reduce or eliminate this congestion. The shared memory 108 includes a portion configured as a first-in, first-out (FIFO) buffer 118 for storing packets arriving for the processing unit 104 when the mailbox 144 is full. The shared memory 108 includes another portion configured as a FIFO buffer 128 for storing packets arriving for the processing unit 106 when the mailbox 146 is full. The starting location of the memory 108 and the size of the portion of the memory 108 allocated to each processing unit to use as its FIFO buffer is programmable via program code executed by the processing unit or by a cluster controller (not shown). To program the starting location of a FIFO buffer, the program code may define the tail and head pointers of the FIFO buffer to point to the starting location of the FIFO buffer. The "tail" refers to the end of the buffer into which new data is fed, as compared to the "head" from which data is read. When the tail and the head point to the same address in the shared memory 108, the FIFO buffer is empty and contains no valid data. When the tail and the head point to different addresses in the shared memory 108, the FIFO buffer contains valid data that is waiting to be processed by the processing unit.

Figure 2:
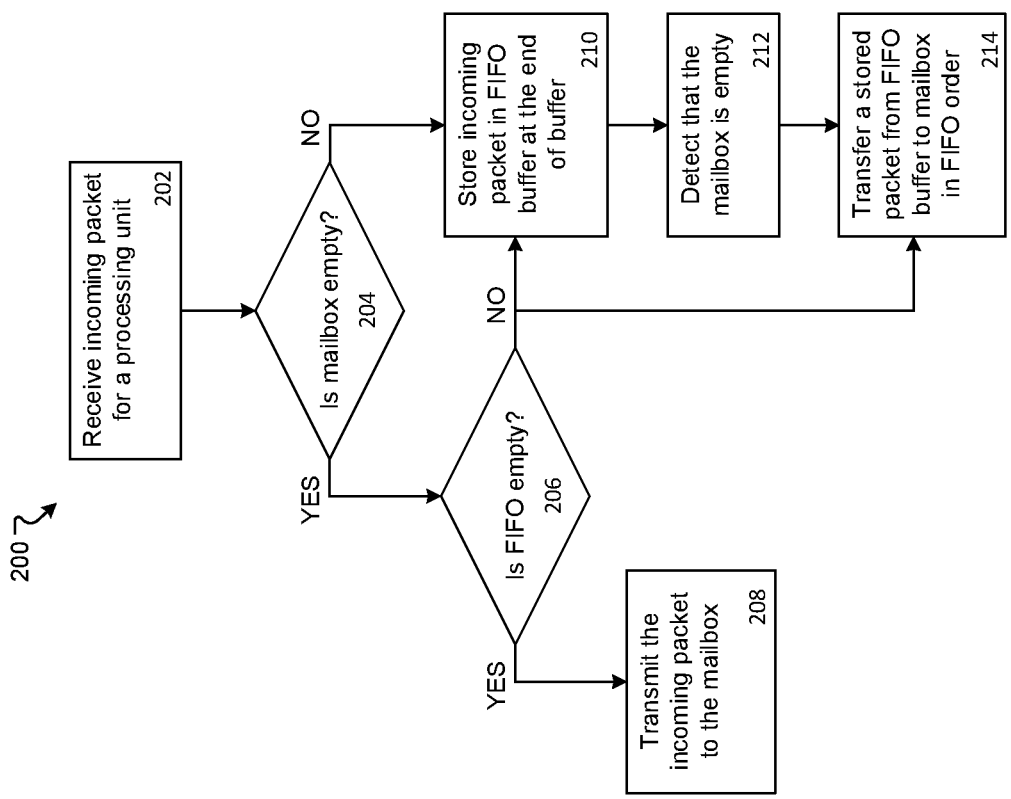
FIG. 2 is a flowchart showing examples of operations for routing packets in a computing system.

To utilize the mailbox 144 of the processing unit 104, the mailbox 146 of the processing unit 106, and the FIFO buffers 118 and 128 of the shared memory 108, the packet interface 102 may include a state machine and related logic to route the packets to the appropriate component in a manner that minimizes network congestion. FIG. 2 is a flowchart showing examples of operations 200 performed by the packet interface 102 to route packets arriving at the computing system 100. When the packet interface 102 receives an incoming packet for a processing unit (202), the packet interface 102 determines whether the processing unit's mailbox is empty (204) by reading the processing unit's mailbox event flag. If the mailbox event flag is unasserted, the mailbox is empty. If the mailbox event flag is asserted, the mailbox is full and contains valid data that should not be overwritten. If the packet interface 102 determines that the mailbox is not empty and thus contains valid data, the packet interface 102 transmits the packet to the shared memory 108 for storage in the processing unit's FIFO buffer at the end (tail) of the buffer (210).

If, after receiving the incoming packet (at 202), the packet interface 102 determines that the mailbox is empty (at 204), the packet interface 102 determines whether the processing unit's FIFO buffer in the shared memory 108 is empty (206). In some implementations, the packet interface 102 compares the address pointer for the tail of the FIFO buffer to the address pointer for the head of the FIFO buffer to determine whether the FIFO buffer is empty.

In some implementations, the packet interface 102 stores valid flags for each FIFO buffer in an internal memory device or in the shared memory 108. A valid flag indicates whether the corresponding FIFO buffer is storing any packets and thus storing valid data waiting to be processed by the processing unit. When the packet interface 102 stores a packet in the FIFO buffer, the packet interface 102 sets the corresponding valid flag. When the packet interface 102 transfers the last packet stored in the FIFO buffer to the processing unit's mailbox, the packet interface 102 clears the corresponding valid flag. The packet interface 102 may read the valid flag for the FIFO buffer to determine whether the FIFO buffer is empty.

If the packet interface 102 determines that the FIFO is empty (at 206), the packet interface 102 transmits the incoming packet to the mailbox (208) for temporary storage while the processing device is processing the data. The packet interface 102 writes the incoming packet's data payload into the mailbox and sets the mailbox event flag.

If the packet interface 102 determines that the FIFO is not empty (at 206), the packet interface 102 transmits the incoming packet to the shared memory 108 for storage in the processing unit's FIFO buffer at the end of the buffer (210), and transfers a stored packet from the processing unit's FIFO buffer to the processing unit's mailbox in FIFO order (214). The packet interface 102 writes the transferred packet's data payload into the mailbox and sets the mailbox event flag.

After storing an incoming packet in the processing unit's FIFO buffer (at 210), the packet interface 102 detects that the mailbox is empty (212) by detecting that the mailbox event flag has been de-asserted by the processor core after the processor core completed processing data stored in the mailbox. The packet interface 102 may receive an event signal from the processing unit when the processor core de-asserts the mailbox event flag, or the packet interface 102 may read the mailbox event flag explicitly. When the packet interface 102 detects that the mailbox is empty, the packet interface 102 transfers a stored packet from the processing unit's FIFO buffer to the processing unit's mailbox in FIFO order (214). The packet interface 102 writes the transferred packet's data payload into the mailbox and sets the mailbox event flag.

After the packet interface 102 sets the mailbox event flag, the processor core of the processing unit will read and use the data held in the mailbox. After the processor core is done processing the data, the processor core clears the mailbox event flag. When the mailbox event flag is cleared, the packet interface 102 will be able to write another packet into the mailbox.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, microprocessor design, and network architectures should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A system comprising:
    packet interface circuitry;
    a first processing unit comprising a processor core configured to process data packets and at least one register configured to store a data packet received from the packet interface circuitry to be processed by the processor core; and
    a memory device accessible to a plurality of processing units including the first processing unit, the memory device comprising a portion configured to store data packets received from the packet interface circuitry to be processed by the processor core of the first processing unit;
    wherein the packet interface circuitry is configured to perform operations including:
        receive a data packet to be processed by the processor core;
        determine whether the at least one register of the first processing unit contains valid data by checking a valid flag corresponding to the at least one register;
        determine whether the memory device portion contains valid data;
        in response to determining (I) that the valid flag corresponding to the at least one register is clear, and (II) that the memory device portion does not contain valid data,
            (a) causing the received data packet to be stored in the at least one register and
            (b) setting the valid flag corresponding to the at least one register;
        in response to determining (I) that the valid flag corresponding to the at least one register is clear, and (II) that the memory device portion contains valid data,
            (a) causing the received data packet to be stored in the memory device portion, or
            (b) causing a data packet previously stored in the memory device portion to be transferred to the at least one register, and setting the valid flag corresponding to the at least one register; and
        in response to determining that the valid flag is set, causing the received data packet to be stored in the memory device portion; and
    wherein the first processing unit is configured to clear the valid flag corresponding to the at least one register after all data stored in the at least one register has been processed by the processor core of the first processing unit.

2. The system of claim 1, wherein the memory device portion is configured as a first-in, first-out (FIFO) buffer.

3. The system of claim 1, wherein a starting memory location and a size of the memory device portion is programmable.

4. The system of claim 1, wherein the memory device comprises a plurality of portions including the memory device portion, each of the plurality of portions associated with a corresponding processing unit of the plurality of processing units, and each of the plurality of portions being configured to store data packets received from the packet interface circuitry to be processed by a processor core of the associated processing unit.

5. The system of claim 1, wherein the packet interface circuitry configured to determine whether the memory device portion contains valid data comprises:
    circuitry configured to check a valid flag corresponding to the memory device portion.

6. The system of claim 5, wherein the packet interface circuitry is configured to perform operations further comprising:
    set the valid flag corresponding to the memory device portion when causing a received data packet to be stored in the memory device portion; and
    clear the valid flag corresponding to the memory device portion when all data packets previously stored in the memory device portion have been transferred to the at least one register.

7. The system of claim 1 wherein the packet interface circuitry configured to perform operations is configured at least in part through software.

8. A method comprising:
    receiving, by packet interface circuitry, a data packet to be processed by a processor core of a first processing unit, the processor core configured to process data packets stored by at least one register of the first processing unit;
    determining whether the at least one register of the first processing unit contains valid data by checking, by the packet interface circuitry, a valid flag corresponding to the at least one register;
    determining, by the packet interface circuitry, whether a memory device portion, accessible by a plurality of processing units including the first processing unit, contains valid data;

in response to determining (I) that the valid flag corresponding to the at least one register is clear, and (II) that the memory device portion does not contain valid data,
- (a) causing, by the packet interface circuitry, the received data packet to be stored in the at least one register, and
- (b) setting, by the packet interface circuitry, the valid flag corresponding to the at least one register;

in response to determining (I) that the valid flag corresponding to the at least one register is clear, and (II) that the memory device portion contains valid data,
- (a) causing, by the packet interface circuitry, the received data packet to be stored in the memory device portion, or
- (b) causing a data packet previously stored in the memory device portion to be transferred to the at least one register, and setting, by the packet interface circuitry, the valid flag corresponding to the at least one register; and in response to determining that the valid flag is set, causing the received data packet to be stored in the memory device portion; and clearing, by the first processing unit, the valid flag corresponding to the at least one register after all data stored in the at least one register has been processed by the processor core of the first processing unit.

9. The method of claim 8, wherein the memory device portion is configured as a first-in, first-out (FIFO) buffer.

10. The method of claim 8, wherein a starting memory location and a size of the memory device portion is programmable.

11. The method of claim 8, wherein the memory device comprises a plurality of portions including the memory device portion, each of the plurality of portions associated with a corresponding processing unit of the plurality of processing units, and each of the plurality of portions being configured to store data packets to be processed by a processor core of the associated processing unit.

12. The method of claim 8, wherein determining whether the memory device portion contains valid data comprises checking, by the packet interface circuitry, a valid flag corresponding to the memory device portion.

13. The method of claim 12, further comprising:
setting, by the packet interface circuitry, the valid flag corresponding to the memory device portion when causing a received data packet to be stored in the memory device portion; and
clearing, by the packet interface circuitry, the valid flag corresponding to the memory device portion when all data packets previously stored in the memory device portion have been transferred to the at least one register.

14. The method of claim 8 wherein the method is performed at least in part through software.

* * * * *